US009593589B2

(12) United States Patent
Trivedi et al.

(10) Patent No.: US 9,593,589 B2
(45) Date of Patent: Mar. 14, 2017

(54) SYSTEM AND METHOD FOR THRUST BEARING ACTUATION TO ACTIVELY CONTROL CLEARANCE IN A TURBO MACHINE

(71) Applicant: General Electric Company, Schenectady, NY (US)

(72) Inventors: Deepak Trivedi, Schenectady, NY (US); Norman Arnold Turnquist, Carlisle, NY (US); Xiaoqing Zheng, Niskayuna, NY (US); Murat Inalpolat, Nashua, NH (US)

(73) Assignee: General Electric Company, Niskayuna, NY (US)

( * ) Notice: Subject to any disclaimer, the term of this patent is extended or adjusted under 35 U.S.C. 154(b) by 570 days.

(21) Appl. No.: 14/193,077

(22) Filed: Feb. 28, 2014

(65) Prior Publication Data
US 2015/0247415 A1    Sep. 3, 2015

(51) Int. Cl.
*F01D 11/22*    (2006.01)
*F01D 25/16*    (2006.01)
(Continued)

(52) U.S. Cl.
CPC .............. *F01D 11/22* (2013.01); *F01D 21/08* (2013.01); *F01D 25/16* (2013.01); *F16C 41/004* (2013.01); *F16C 17/04* (2013.01)

(58) Field of Classification Search
CPC . F01D 11/22; F01D 21/08; F01D 3/04; F01D 25/166; F01D 25/168; F16C 41/004;
(Continued)

(56) References Cited

U.S. PATENT DOCUMENTS 4,815,931 A    3/1989 Linck et al.
5,166,626 A    11/1992 Hester et al.
(Continued)

FOREIGN PATENT DOCUMENTS

EP    1131537 B1    10/2004
FR    2722836 A1    1/1996
(Continued)

OTHER PUBLICATIONS

Fabian et al., "Capacitive sensor for active tip clearance control in a palm-sized gas turbine generator", Instrumentation and Measurement, IEEE Transactions on, vol. 54, Issue 3, pp. 1133-1143, Jun. 2005.
(Continued)

*Primary Examiner* — Igor Kershteyn
*Assistant Examiner* — Justin Seabe
(74) *Attorney, Agent, or Firm* — Ann M. Agosti

(57) ABSTRACT

An actuation system to control clearance in a turbomachine including a shaft bearing including at least one axially displaceable thrust bearing. The axially displaceable thrust bearing configured to axially displace a rotating component relative to a stationary component to control the clearance therebetween. The system further including a plurality of actuators coupled to the at least one axially displaceable thrust bearing and configured to actuate the at least one axially displaceable thrust bearing to control the clearance. The plurality of actuators is configured to deactivate a diametrically opposed actuator in the event of an actuator failure to maintain zero moment. In a topography network, each diametrically opposed actuator pair is coupled to a single control line. In an alternate topography network, alternating actuators are coupled to a single control line. In addition, a method of actuating a thrust bearing to control clearance in a turbomachine is disclosed.

20 Claims, 5 Drawing Sheets

(51) Int. Cl.
*F16C 41/00* (2006.01)
*F01D 21/08* (2006.01)
*F16C 17/04* (2006.01)

(58) Field of Classification Search
CPC .... F16C 17/04; F16C 32/0666; F16C 32/067; F16C 32/0692
See application file for complete search history.

(56) References Cited

U.S. PATENT DOCUMENTS

| | | | |
|---|---|---|---|
| 5,263,816 A | 11/1993 | Weimer et al. | |
| 5,330,320 A | 7/1994 | Mansson | |
| 5,449,235 A | 9/1995 | Buckmann | |
| 5,658,125 A | 8/1997 | Burns et al. | |
| 6,102,655 A | 8/2000 | Kreitmeier | |
| 6,155,038 A | 12/2000 | Irwin et al. | |
| 6,692,222 B2 | 2/2004 | Prinz et al. | |
| 6,875,067 B2 * | 4/2005 | Tornblad | B63H 11/08 440/38 |
| 7,125,223 B2 | 10/2006 | Turnquist et al. | |
| 7,234,918 B2 | 6/2007 | Brillert et al. | |
| 7,246,994 B2 | 7/2007 | Lewis | |
| 7,559,741 B2 | 7/2009 | Reichert et al. | |
| 7,575,409 B2 | 8/2009 | Dierksmeier et al. | |
| 7,686,569 B2 | 3/2010 | Paprotna et al. | |
| 7,717,671 B2 | 5/2010 | Addis | |
| 8,016,553 B1 | 9/2011 | Liang | |
| 8,092,146 B2 | 1/2012 | Legare et al. | |
| 8,162,598 B2 | 4/2012 | Liang | |
| 8,177,483 B2 * | 5/2012 | McCallum | F01D 11/22 415/127 |
| 8,240,986 B1 | 8/2012 | Ebert | |
| 8,449,243 B2 * | 5/2013 | Fiala | F01D 3/04 415/105 |
| 8,550,767 B2 | 10/2013 | Horn et al. | |
| 2002/0009361 A1 | 1/2002 | Reichert et al. | |
| 2003/0215323 A1 | 11/2003 | Prinz et al. | |
| 2006/0133927 A1 | 6/2006 | Brillert et al. | |
| 2008/0063513 A1 | 3/2008 | Afanasiev | |
| 2009/0003991 A1 | 1/2009 | Andarawis et al. | |
| 2009/0206039 A1 | 8/2009 | Rothmann et al. | |
| 2010/0183424 A1 | 7/2010 | Roy | |
| 2011/0229301 A1 | 9/2011 | Miller | |
| 2013/0156541 A1 | 6/2013 | Eleftheriou et al. | |

FOREIGN PATENT DOCUMENTS

| | | | |
|---|---|---|---|
| GB | 2129880 A | 11/1982 | |
| IT | EP 0816697 A2 * | 1/1998 | F16C 32/0644 |

OTHER PUBLICATIONS

"Hydraulic Clearance Optimization for Siemens Gas Turbines", Siemens, 2009.

* cited by examiner

SYSTEM AND METHOD FOR THRUST BEARING ACTUATION TO ACTIVELY CONTROL CLEARANCE IN A TURBO MACHINE

BACKGROUND

The subject matter disclosed herein relates generally to clearance control in a turbo machine. More specifically, the subject matter relate to methods and systems for thrust bearing actuation to control clearance in a turbo machine.

Minimizing clearance between blade tips of a rotor and stationary parts in a turbo machine is desirable to reduce leakage of a working fluid around the blade tips.

Losses due to blade tip clearance results in lower efficiency and higher fuel consumption. During the operating life of the machine, blade tip clearance increases over time due to mechanical rubs between the rotating blades and the stationary casing, thereby affecting performance of the machine.

It is sometimes desirable to dynamically change clearance during operation of the machine. Several existing blade tip clearance adjustment mechanisms include complicated linkages and contribute to significant weight and/or require a considerable amount of power for operation of the machine.

An enhanced system and method for thrust bearing actuation to control blade tip clearance in rotating machines are desirable.

BRIEF DESCRIPTION

In accordance with one exemplary embodiment an actuation system to control clearance in a turbomachine is disclosed. The system includes a shaft bearing including at least one axially displaceable thrust bearing configured to axially displace a rotating component relative to a stationary component to control the clearance therebetween; and a plurality of actuators coupled to the at least one axially displaceable thrust bearing and configured to actuate the at least one axially displaceable thrust bearing to control the clearance. The plurality of actuators is configured to deactivate a diametrically opposed actuator in the event of an actuator failure to maintain zero moment.

In accordance with another embodiment, a turbomachine is disclosed. The turbomachine includes a stationary component, a rotating component, a plurality of rotor blades, a shaft bearing and a plurality of actuators. The stationary component including an inner wall. The rotating component carrying a plurality of rotor blades each having a blade tip facing towards the inner wall and having a clearance formed between each said blade tip and said inner w. The shaft bearing including at least one axially displaceable thrust bearing configured to axially displace the rotating component relative to the stationary component to control the clearance therebetween. The plurality of actuators circumferentially arranged relative to the thrust bearing and coupled thereto via a plurality of control lines. The plurality of actuators configured to actuate the at least one axially displaceable thrust bearing to control the clearance and to deactivate a diametrically opposed actuator in the event of an actuator failure to maintain zero moment.

In accordance with another aspect of the present technique, a method of actuating a thrust bearing to control clearance in a turbomachine is disclosed. The method includes determining a relationship between a reliability of an actuation system relative to a reliability of a plurality of actuators coupled to a shaft bearing via the actuation system. The shaft bearing includes at least one axially displaceable thrust bearing configured to axially displace a rotating component relative to a stationary component to control the clearance therebetween. Next, a topography network is determined for actuation of the plurality of actuators based on the determined reliability relationship between the actuation system and the actuators. The thrust bearing is next axially actuated via a mechanical support configured between the actuators and the thrust bearing. The plurality of actuators are configured to deactivate a diametrically opposed actuator in the event of an actuator failure to maintain zero moment.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments of the present invention relate to a system and a method for thrust bearing actuation to control clearance in a turbo machine. As used herein, the system and a method for thrust bearing actuation is applicable to various types of turbomachinery applications such as, but not limited to, turbojets, turbo fans, turbo propulsion engines, aircraft engines, gas turbines, steam turbines and compressors. In addition, as used herein, singular forms such as "a", "an", and "the" include plural referents unless the context clearly dictates otherwise.

Figure 1:
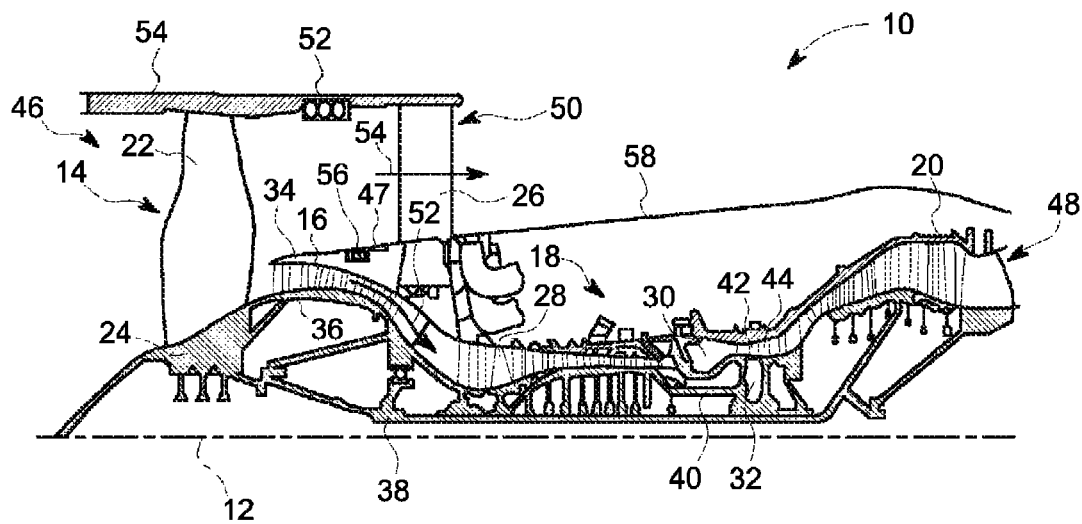
FIG. 1 is a diagrammatic illustration of an engine, according to one or more embodiments shown or described herein.

Referring now to the drawings, in which like numerals refer to like elements throughout the several views, FIG. 1 is a schematic illustration of an exemplary aircraft engine assembly 10 in accordance with the present disclosure. Reference numeral 12 may be representative of a centerline axis. In the exemplary embodiment, the engine assembly 10 includes a fan assembly 14, a booster compressor 16, a core gas turbine engine 18, and a low-pressure turbine 20 that may be coupled to the fan assembly 14 and the booster compressor 16. The fan assembly 14 includes a plurality of rotor fan blades 22 that extend substantially radially outward from a fan rotor disk 24, as well as a plurality of outlet guide vanes 26 that may be positioned downstream of the rotor fan blades 22. The core gas turbine engine 18 includes a high-pressure compressor 28, a combustor 30, and a high-pressure turbine 32. The booster compressor 16 includes a plurality of rotating components, and more specifically rotor blades 34 that extend substantially radially outward from a compressor rotor disk 36 coupled to a first drive shaft 38. The high-pressure compressor 28 and the high-pressure turbine 32 are coupled together by a second drive shaft 40. The high-pressure turbine 32 includes a plurality of rotating components, and more specifically rotor blades, 42 and a plurality of stationary components, and more specifically stators, 44. The engine assembly 10 also includes an intake side 46, a core engine exhaust side 48, and a fan exhaust side 50.

During operation, the fan assembly 14 compresses air entering the engine 10 through the intake side 46. The airflow exiting the fan assembly 14 is split such that a portion 52 of the airflow is channeled into the booster compressor 16, as compressed airflow, and a remaining portion 54 of the airflow bypasses the booster compressor 16 and the core gas turbine engine 18 and exits the engine 10 through the fan exhaust side 50 as bypass air. A plurality of rotor blades 34 compress and deliver the compressed airflow 52 towards the core gas turbine engine 18. Furthermore, the airflow 52 is further compressed by the high-pressure compressor 28 and is delivered to the combustor 30. Moreover, the compressed airflow from the combustor 30 drives the rotating high-pressure turbine 32 and the low-pressure turbine 20 and exits the engine 10 through the core engine exhaust side 48.

Seals are employed at virtually all turbine locations where leakage between rotating and stationary components must be controlled, such as for example between rotors and stators, such as rotors 42 and stators 44 of FIG. 1. Accordingly, the engine assembly 10 includes a thrust bearing actuation system to actively control clearance between the rotating and stationary components so as to prevent leakage in the aforementioned seals. A system and method for seal design and clearance control in a turbomachine is described in detail in U.S. patent application Ser. No. 13/596,386, entitled, "Seal Design and Active Clearance Control Strategy for Turbomachines", filed on Aug. 28, 2012 by Trivedi et al., assigned to the same assignee and incorporated herein by reference.

Figure 2:
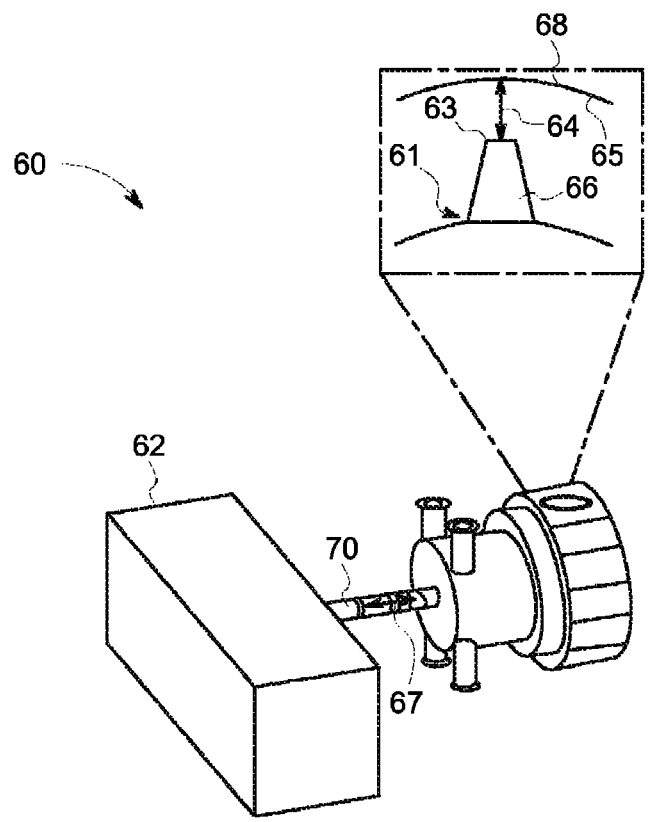
FIG. 2 is a diagrammatic illustration of a portion of the engine of FIG. 1, illustrating a system and method for thrust bearing actuation to control clearance, according to one or more embodiments shown or described herein.

FIG. 2 is a diagrammatic illustration of a portion of a rotary machine, for example, a turbine, 60 such as may be utilized in engine 10 of FIG. 1. As illustrated the rotary machine includes a thrust bearing actuation system 62 to control a clearance between rotating components and stationary components so as to prevent leakage in the seals, such as the aforementioned seals, in accordance with an exemplary embodiment. In an embodiment, the thrust bearing actuation system 62 includes a plurality of actuators (described presently) providing actuation to a thrust bearing (described presently). As best illustrated in FIG. 2, the thrust bearing actuation system 62 is used to provide thrust bearing actuation to actively control clearance 64 between rotating component, such as the rotor 42 of FIG. 1, of the rotary machine 60 and a stationary component 68. The rotating component 66 carrying a plurality of rotor blades 61 each having a blade tip 63 facing towards an inner wall 65 and having the clearance 64 formed between each said blade tip 63 and said inner wall 65. In an embodiment, the clearance 64 is an axial clearance between the rotating component 66 and a stationary component 68 in the rotary machine 60. In another embodiment, the clearance 64 is a radial clearance between the rotating component 66 and the stationary component 68 in the rotary machine 60. A system and method for estimating and control of the clearance 64 in a turbomachine is described in detail in U.S. patent application Ser. No. 14/132,313, entitled, "System And Method for Estimation and Control of Clearance in a Turbomachine", filed on Dec. 18, 2013 by Turnquist et al., assigned to the same assignee and incorporated herein by reference.

Figure 3:
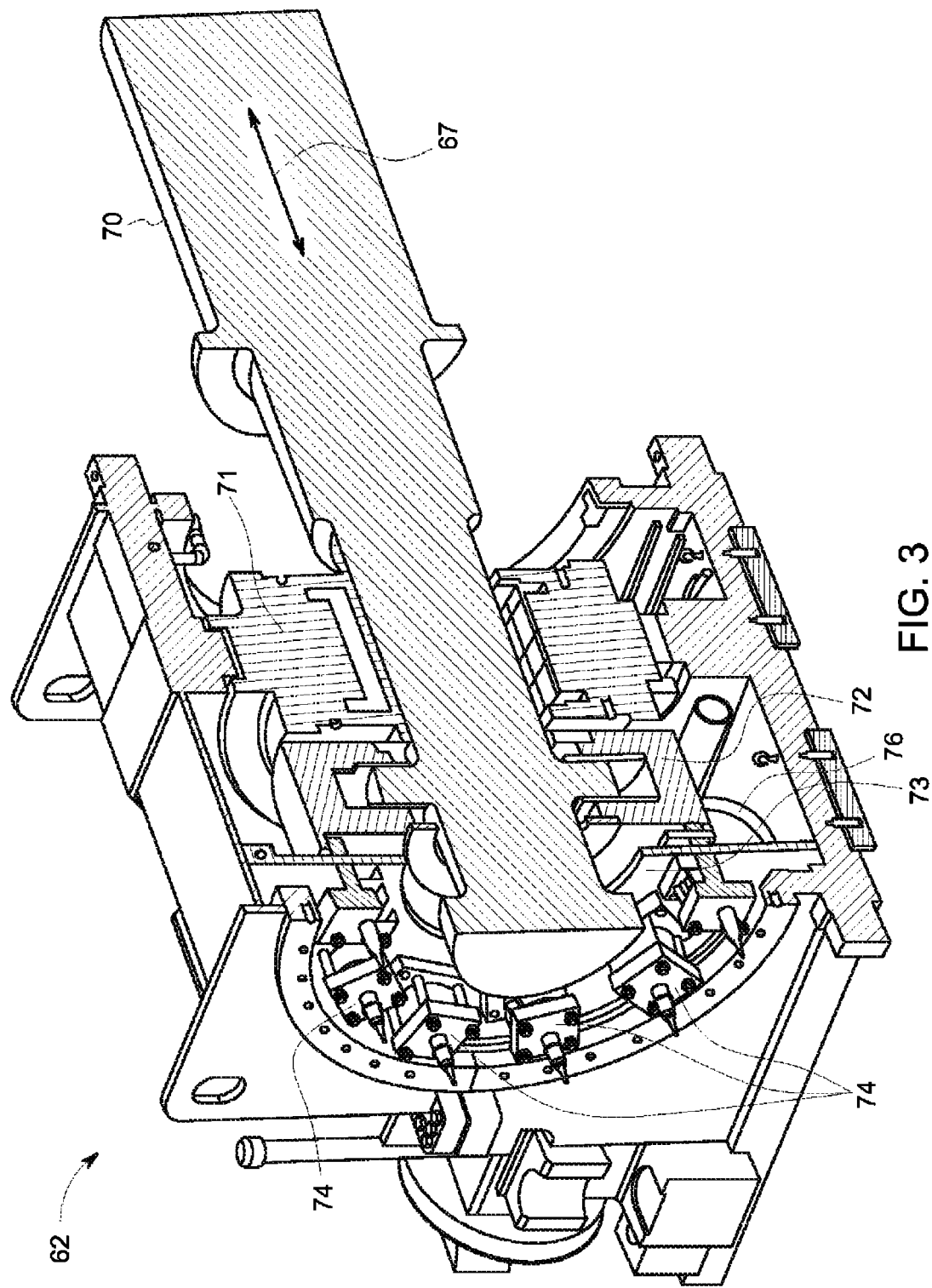
FIG. 3 is a diagrammatical illustration of a portion of the engine of FIG. 1, illustrating a system and method for thrust bearing actuation to control clearance, according to one or more embodiments shown or described herein.

As previously indicated, a seal, such as a labyrinth seal (not shown) is disposed between the rotating component 66 and the stationary component 68. The seal may function by placing a relatively large number of barriers, i.e., teeth, to the flow of fluid from a high pressure region to a low pressure region on opposed sides of the seal, with each barrier forcing the fluid to follow a tortuous path whereby pressure drop is created. The rotating component 66 is free to move axially via a rotating shaft 70, as indicated by the directional arrow, during operation. Referring now to FIG. 3, during operation, as the rotating shaft 70 and rotating components 66 heat up, the rotating shaft 70 "grows" in an axial direction, as indicated by the axial directional arrow 67, so as to be displaced away from an active thrust bearing 72. The axial motion of the rotating shaft 70, and thus the rotating components 66 (FIG. 2), is controlled by a plurality of actuators 74 and is relative to growth of the rotating shaft 70 and rotating components 66 axially to the active thrust bearing 72. More particularly, axial motion of the rotating shaft 70, and thus the rotating components 66 (FIG. 2), is controlled by a plurality of actuators 74 including at least three points of actuation, using one or more actuators 74. The novel thrust bearing actuation system 62 and method (described in greater detail below) provides actuation of this axial displacement and thus radial clearances, between the rotating component 66 and the stationary component 68 to open and close as required. In accordance with one embodiment, and as previously described, the novel thrust bearing actuation system and method disclosed herein provides an axial degree of freedom to a rotating component, thereby providing for adjustment of radial and axial clearances provided between the rotating component and the stationary component.

The rotary machine 60 of FIG. 2 exhibits a plurality of operating conditions during an operational cycle. In one embodiment, the operating condition is a long rotor condition. The long rotor condition is a transient operating condition of the rotary machine 60 in which, in one specific embodiment, the rotary machine 60 undergoes transition from a shut-down condition to a steady state condition. During the long rotor condition, the rotating components 66 of the rotary machine 60 expand thermally along an axial direction relative to the thrust bearing 72 (FIG. 3) and along a radial direction resulting in a shell growth (also referred to as 'case expansion'). During this stage, rotating component 66 is at its longest relative to the stationary component 68. When steady state engine operation is achieved, the rotating component 66, having grown or lengthened axially relative to the stationary component 68, is adjusted axially, as indicated by axial directional arrow 67, to "close" the clearances 64 formed therebetween the rotating component 66 and the stationary component 68. This axial adjustment of the rotating component 66 closes the radial clearances between the rotating component 66 and the stationary component 68.

In another embodiment, the operating condition is a short rotor condition. The short rotor condition is a transient operating condition of the rotary machine 60 in which, in one specific embodiment, the rotary machine 60 undergoes transition from the steady state condition to the shut-down condition. During the short rotor condition, the rotating components 66 of the rotary machine 60 contract thermally along an axial direction relative to the thrust bearing 72 (FIG. 3) and along a radial direction resulting in a shell contraction (also referred to as 'case contraction'). The duration of thermal contraction of the outer casing is relatively faster compared to the duration of thermal contraction of the rotating components 66 of the turbo machine 60. With regard to long and short rotor operating conditions, it is anticipated that thermal response of the stator or rotor could be faster or slower depending on the design of the machine.

During the operation of the rotary machine 60, a clearance control mechanism is configured to maintain the clearance 64 for a plurality of operating conditions throughout the operation cycle. As disclosed herein, the clearance control mechanism may be controlled by the thrust bearing actuation system 62, including the plurality of actuators 74 (FIG. 3). In an exemplary embodiment a plurality of clearance profiles may be generated for a plurality of operating conditions of the rotary machine 60. The clearance control mechanism may then be configured for the rotary machine 60 and controlled, based on the generated plurality of clearance profiles for the plurality of operating conditions.

Figure 4:
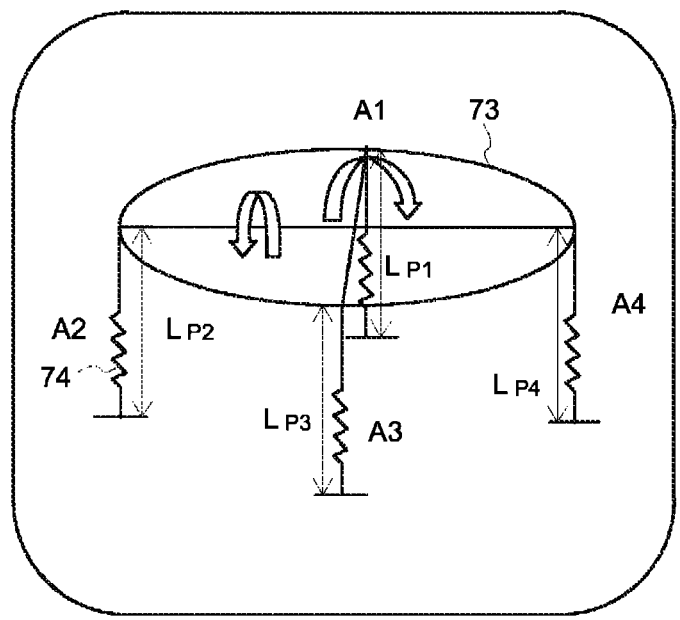
FIG. 4 is a schematic illustration of a thrust bearing and actuator configuration illustrating a tunable actuator configuration and structural stiffness to avoid large system deflections and to decrease load sharing inequalities of a thrust bearing actuation system, according to one or more embodiments shown or described herein.

As previously indicated the plurality of actuators 74 provides control of the axial motion of the rotating components 66. The actuators 74 are coupled to a shaft bearing 71 including at least one axially displaceable thrust bearing 72, via a thrust bearing support 73 and control lines 76, so as to minimize system deflection while ensuring uniform load sharing between the actuators 74. In an embodiment, the actuators 74 are configured as hydraulic actuators. In an alternate embodiment, the actuators 74 are configured as electromagnetic actuators, or any other type of actuator capable of providing control of the axial motion of the rotating components 66. The structural stiffness of the attachment system is tuned to minimize system deflection and load sharing inequalities between the actuators 74. A stiffness margin and a deflection requirement are determined as a part of the design practice, and appropriate structural stiffness is chosen using an analytical tool developed for this purpose. The mechanical design of the coupling of the actuators 74 to the thrust bearing 72, via the thrust bearing support 73, is such that its stiffness is small until load sharing between the actuators 74 is equalized and high thereafter. Referring more specifically to FIG. 4, illustrated schematically are four actuators 74 labeled A1, A2, A3 and A4, having lengths $L_{P1}$, $L_{P2}$, $L_{P3}$ and $L_{P4}$, respectively. As illustrated, structural stiffness of the thrust bearing support 73 is tunable at the design stage to avoid large system deflections, as indicated by the directional arrows, as well as to decrease load sharing inequalities. Due to small differences in the lengths of the actuators, the load applied on the bearing support 73 will be shared unequally between the four actuators A1, A2, A3 and A4. The degree of variability of load sharing, defined by the safety factor (max load/avg load) is a function of the stiffness of the actuators 74. If the actuators 74 are compliant, they will deflect under a relatively small load until $L_{P1}=L_{P2}=L_{P3}=L_{P4}$ and further loading will be shared equally among all actuators 74. If the actuators 74 are stiff, a large proportion of the load is required before $L_{P1}=L_{P2}=L_{P3}=L_{P4}$.

Figure 5:
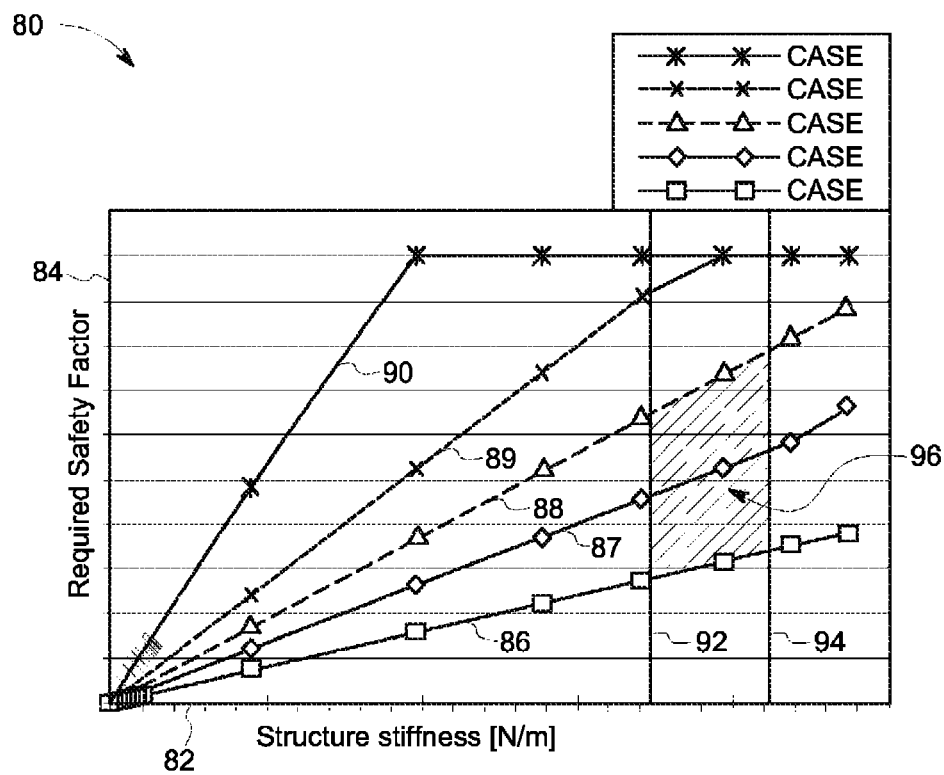
FIG. 5 is a graphical plot illustrating structural stiffness relative to recommended safety factor of a thrust bearing actuation to control clearance, according to one or more embodiments shown or described herein.

Illustrated in FIG. 5 is a graphical plot, generally referenced 80, showing structural stiffness (plotted on axis 82) with required safety factor (plotted on axis 84) of a thrust bearing actuation system, and more particularly the thrust bearing support 73 (FIG. 4) in accordance with an embodiment described herein. FIG. 5 illustrates how the load sharing inequality is related to structural stiffness (plotted on axis 82), as well as the dimensional mismatch between the actuators 74. Any inequality in load sharing must be compensated for by having a safety factor (plotted on axis 84) on the load carrying capability of the actuator 74. For example, in an embodiment, if the maximum load/avg load=1.2 and nominal load to be carried by the actuator 74 is 1000 N, the actuators 74 will need to be overdesigned by a factor of 20% (1200 N) to allow for the inequality. Therefore, the maximum load/avg load is also the required safety factor for the actuators 74. In this way, FIG. 5 set stiffness, tolerance and sizing (safety factor) requirements for the system.

As illustrated in FIG. 5, curves 86, 87, 88, 89 and 90 represent the required safety factor vs. structural stiffness for increasing levels of manufacturing imperfection (tolerance). More particularly, the design stiffness of the thrust bearing support in a first case study (shown by plotted points/line 86) illustrates as the required safety factor increases, the structural stiffness increases. Comparatively, additional case studies as illustrated show the design stiffness of a thrust bearing support in a second case study (shown by plotted points/line 87), a third case study (shown by plotted points/line 88), a fourth case study (shown by plotted points/line 89) and a fifth case study (shown by plotted points/line 90) where, case studies 1-5 indicate increasing levels of manufacturing imperfection. Each plotted line 86-90, illustrates a required safety factor increase with structural stiffness and with manufacturing imperfection. Deflection requirements dictate that the structural stiffness must be above a lower threshold 92. The worst and best case manufacturing tolerances achievable are shown by lines 86 and 88. The maximum achievable safety factor sets the vertical line on the right 94, which provides the upper bound to the structural stiffness. Therefore, the cross-hatched area 96 is identified as the design space in which the actuation support system is ideally designed.

Figure 6:
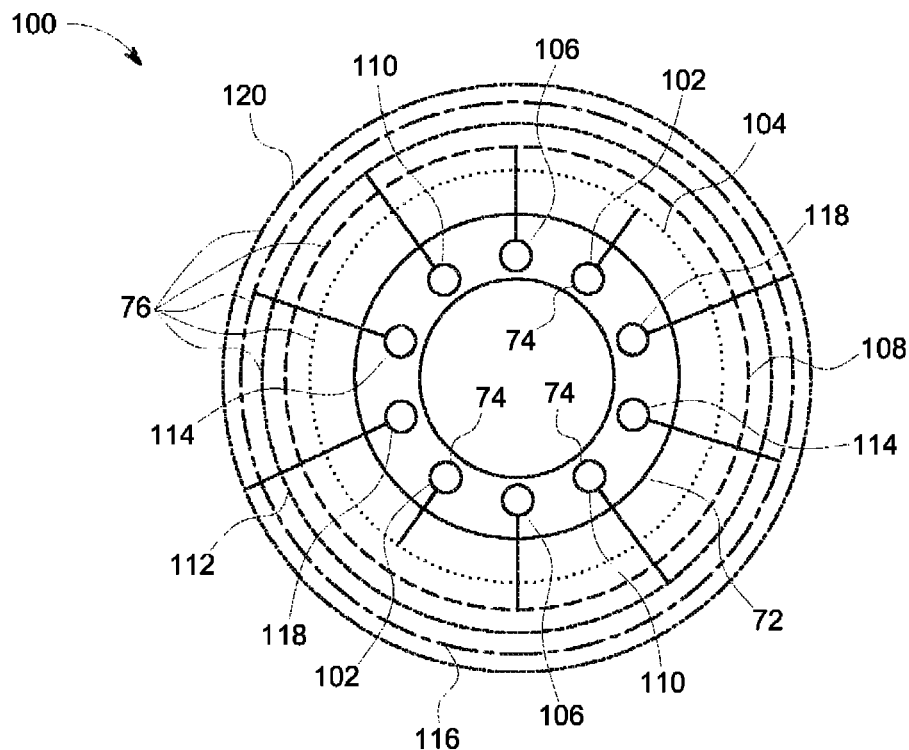
FIG. 6 is a diagrammatical illustration of a topography network of a system and method for thrust bearing actuation to control clearance, in accordance with an exemplary embodiment.
Figure 7:
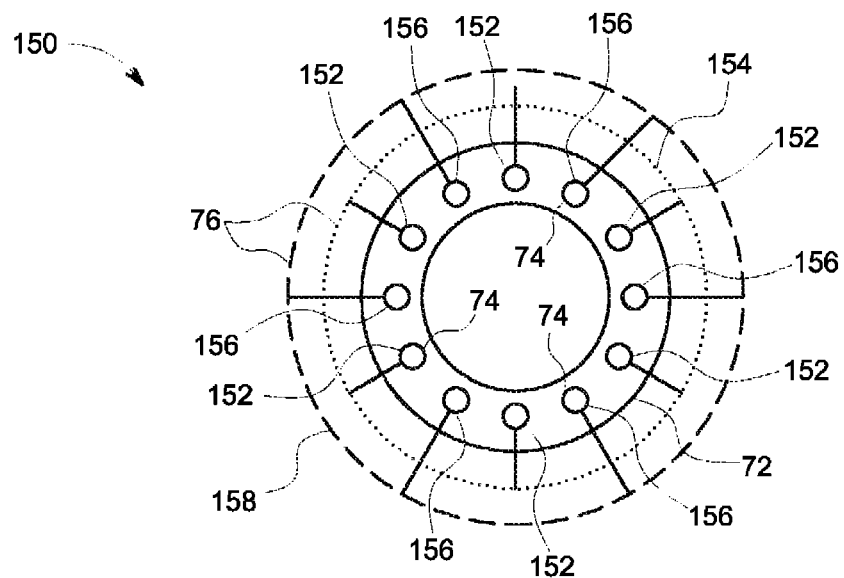
FIG. 7 is a diagrammatical illustration of another topography network of a system and method for thrust bearing actuation to control clearance, according to one or more embodiments shown or described herein.

Referring more specifically to FIGS. 6 and 7, illustrated is a network topology and associated operational and reversion logic associated with the plurality of actuators 74 of the thrust bearing actuation system 62 (FIG. 2) disclosed herein. As illustrated, in this particular embodiment, ten to twelve 74 are circumferentially arranged relative to the thrust bearing 72 and coupled thereto via the plurality of control lines 76. It is anticipated, in alternate embodiments, any number of actuators 74 may be incorporated into the thrust bearing actuation system. In an exemplary embodiment, a requirement may be set that at least six of the ten to twelve actuators 74 must be operational at any given time. This number will be a function of the size of the machine. The operational logic mandates that if an actuator 74 fails, a diametrically opposed actuator 74 is also deactivated to maintain zero moment. Based on relative and absolute reliabilities of the actuators 74 and the control lines 76, two topologies (described presently) are optimal. In both topologies, if an actuator 74 fails, a diametrically opposed actuator 74 is deactivated to maintain zero moment. Accordingly, network topology is optimized for reliability.

Illustrated schematically in FIG. 6 is a first topology network 100 for use when the system reliability is greater than the reliability of the actuators or if both are reliable (as an example, a reliability value of 0.99 for both). The topology network 100 is illustrated including the plurality of actuators 74, and more specifically configured to include ten individual actuators 74. The actuators 74 are configured substantially symmetrically about the thrust bearing 72. In the illustrated configuration, each diametrically opposed actuator pair is coupled to a single control line 76. More particularly, as illustrated a first pair of diametrically opposed actuators 102 are coupled to a first control line 104. A second pair of diametrically opposed actuators 106 is coupled to a second control line 108. A third pair of diametrically opposed actuators 110 is coupled to a third control line 112. A fourth pair of diametrically opposed actuators 114 is coupled to a fourth control line 116. A fifth pair of diametrically opposed actuators 118 is coupled to a fifth control line 120. An example of an equation for the actuation system reliability in the topography network 150 is represented by $$1 - \sum_{j=0}^{2} C_j^5 (pq^2)^j (1 - pq^2)^{5-j}$$

where p is representative of the failure rate of the system, q is representative of the failure rate of the actuator, j is an index going from 0 to 2 and C is the combinatoric "choose" function. It is to be noted that simpler or more complicated expressions for reliability are possible. The premise is to use component level failure rates p and q to obtain system level failure rate using combinatorics and probability.

Illustrated schematically in FIG. 7 is a second topology network 150 for use when the reliability of the actuators 74 is greater than the system reliability, or if both are unreliable. The topology network 150 is illustrated including the plurality of actuators 74, and more specifically configured to include twelve individual actuators 74. The actuators 74 are configured substantially symmetrically about the thrust bearing 72. In the illustrated configuration, alternating actuators 74 are coupled to a single control line 76. More particularly, as illustrated a first group of alternating actuators 152 are coupled to a first control line 154. A second group of alternating actuators 156 are coupled to a second control line 158. The actuation system reliability in the topography network 150 is represented by the following equation:

$$\left\{ 1 - \left( 1 - p \sum_{j=2}^{3} C_j^3 q^{2j} (1 - q^2)^{3-j} \right)^2 \right\} +$$

$$\left\{ \left( 1 - p \sum_{j=1}^{3} C_j^3 q^{2j} (1 - q^2)^{3-j} \right) \left( 1 - p \sum_{j=3}^{3} C_j^3 q^{2j} (1 - q^2)^{3-j} \right) \right\}^2$$

where p is representative of the failure rate of the system, q is representative of the failure rate of the actuator, j is an index going from 0 to 2_and C is the combinatoric "choose" function. It is to be noted that simpler or more complicated expressions for reliability are possible. The premise is to use component level failure rates p and q to obtain system level failure rate using combinatorics and probability.

As previously indicated, during a failure event of the thrust bearing actuation system as disclosed herein, such as if an actuator 74 fails, either topography network 100 or 150 provides deactivation of a diametrically opposed actuator 74 so as to maintain zero moment thus avoiding large system deflections and load sharing inequalities.

Figure 8:
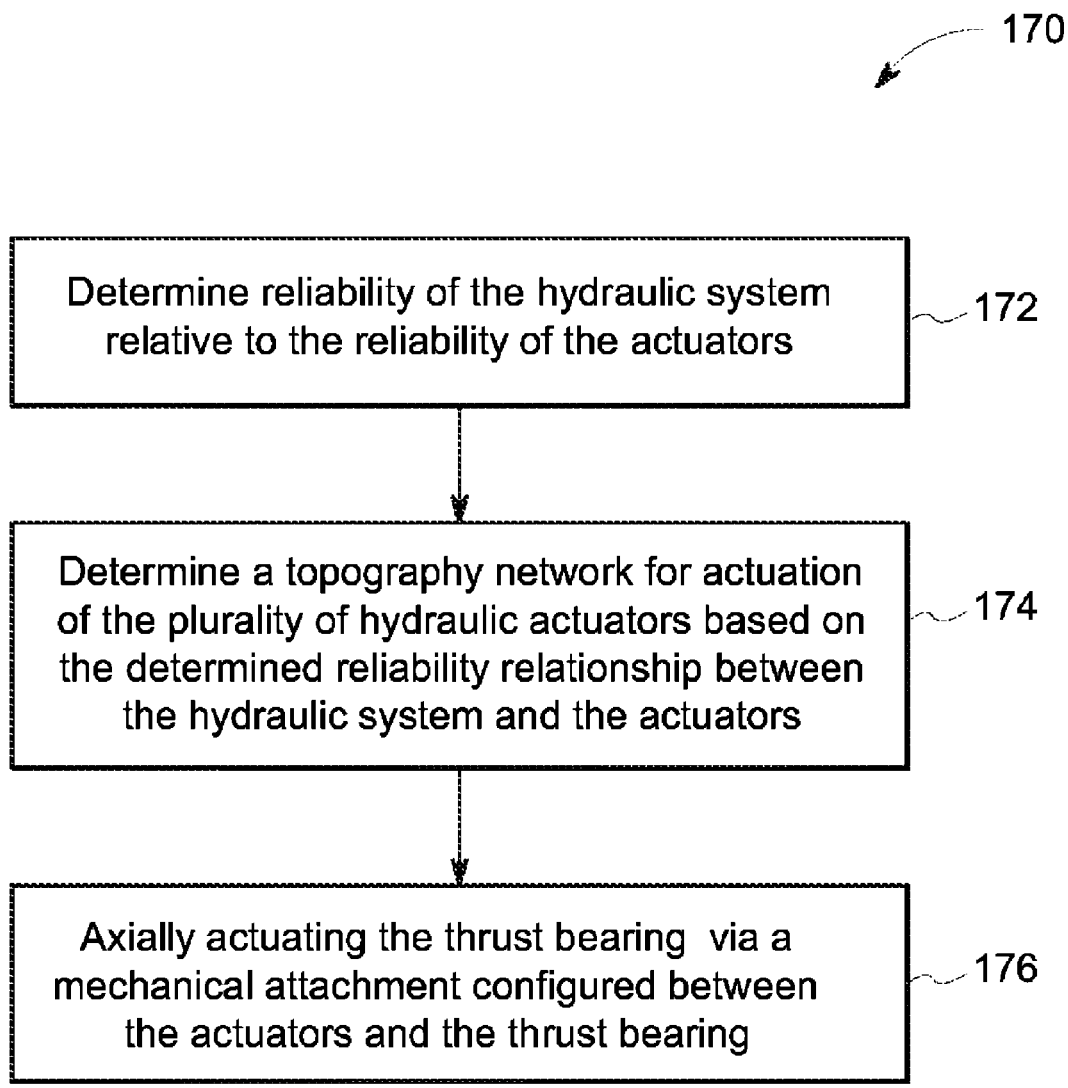
FIG. 8 illustrates a flow chart showing a method for thrust bearing actuation to control clearance, according to one or more embodiments shown or described herein.

FIG. 8 illustrates a flow chart 170 representative of a method for thrust bearing actuation to control clearance between a stationary component and a rotating component in accordance with an exemplary embodiment. The method includes determining reliability of the system relative to the reliability of the actuators, in a step 172. Next, a topography network for actuation of the plurality of actuators is determined, in a step 174, based on determined reliability relationship between the system and the actuators. In a step 176, the thrust bearing is next axially actuated via a mechanical support between the actuators and the thrust bearing, in response to the actuators and a topography network to a desired clearance between the stationary component and a rotating component.

Accordingly, disclosed herein is an thrust bearing actuation system for a turbomachine thrust bearing, with the objective of actuating clearance control while avoiding large system deflections and load sharing inequalities. The thrust bearing actuation system described herein provides an alternate means of axially actuating the turbomachine thrust bearing, with additional benefit of optimized reliability. The thrust bearing actuation system disclosed herein enables clearance control, resulting in a reduction in the likelihood of seal rubs and leakage, and leading to an increase in turbomachine performance and greater operational flexibility without an increase in the footprint of the turbomachine or adding excessive operational risk to the turbomachine. Exemplary embodiments disclosed herein enable thrust bearing actuation to control clearance in a turbo machine in real time.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

What is claimed as new and desired to be protected by Letters Patent of the United States is:

1. An actuation system to control clearance in a turbomachine comprising:
    a shaft bearing including at least one axially displaceable thrust bearing configured to axially displace a rotating component relative to a stationary component to control the clearance therebetween; and a plurality of actuators coupled to the at least one axially displaceable thrust bearing and configured to actuate the at least one axially displaceable thrust bearing to control the clearance, whereby the plurality of actuators are configured to deactivate a diametrically opposed actuator in the event of an actuator failure to maintain zero moment.

2. The actuation system as claimed in claim 1, including at least three points of actuation using one or more actuators.

3. The actuation system as claimed in claim 1, wherein the plurality of actuators are circumferentially arranged relative to the at least one axially displaceable thrust bearing, configured substantially symmetrically about the thrust bearing and coupled thereto via a plurality of control lines.

4. The actuation system as claimed in claim 3, wherein the plurality of actuators are coupled to the plurality of control lines defining a topography network wherein in the event of an actuator failure, a diametrically opposed actuator is deactivated.

5. The actuation system as claimed in claim 4, wherein each diametrically opposed actuator pair is coupled to a single control line.

6. The actuation system as claimed in claim 5, wherein each pair of actuators is connected to a separate control line.

7. The actuation system as claimed in claim 4, wherein alternating actuators are coupled to a single control line.

8. The actuation system as claimed in claim 7, wherein a first group of alternating actuators is coupled to a first control line and a second group of alternating actuators is coupled to a second control line.

9. The actuation system as claimed in claim 3, wherein the plurality of actuators are hydraulic actuators coupled to a plurality of hydraulic control lines defining a topography network.

10. A turbomachine, comprising:
a stationary component including an inner wall;
a rotating component carrying a plurality of rotor blades each having a blade tip facing towards the inner wall and having a clearance formed between each said blade tip and said inner wall;
a shaft bearing including at least one axially displaceable thrust bearing configured to axially displace the rotating component relative to the stationary component to control the clearance therebetween; and
a plurality of actuators circumferentially arranged relative to the thrust bearing and coupled thereto via a plurality of control lines, the plurality of actuators configured to actuate the at least one axially displaceable thrust bearing to control the clearance and to deactivate a diametrically opposed actuator in the event of an actuator failure to maintain zero moment.

11. The turbomachine as claimed in claim 10, wherein the plurality of actuators are circumferentially arranged relative to the at least one axially displaceable thrust bearing and coupled thereto via a plurality of actuation lines to define a topography network.

12. The turbomachine as claimed in claim 11, wherein each diametrically opposed actuator pair is coupled to a single control line.

13. The turbomachine as claimed in claim 12, wherein each pair of actuators is connected to a separate control line.

14. The turbomachine as claimed in claim 11, wherein alternating actuators are coupled to a single control line.

15. The turbomachine as claimed in claim 14, wherein a first group of alternating actuators is coupled to a first control line and a second group of alternating actuators is coupled to a second control line.

16. The turbomachine as claimed in claim 10, wherein the clearance is one of a radial clearance or an axial clearance between the rotating component and a stationary component.

17. A method of actuating a thrust bearing to control clearance in a turbomachine comprising:
determining a relationship between a reliability of an actuation system relative to a reliability of a plurality of actuators coupled to a shaft bearing via the actuation system, wherein the shaft bearing includes at least one axially displaceable thrust bearing configured to axially displace a rotating component relative to a stationary component to control the clearance therebetween;
determine a topography network for actuation of the plurality of actuators based on the determined reliability relationship between the actuation system and the actuators;
axially actuating the thrust bearing via a mechanical support configured between the actuators and the thrust bearing,
whereby the plurality of actuators are configured to deactivate a diametrically opposed actuator in the event of an actuator failure to maintain zero moment.

18. The method of actuating a thrust bearing as claimed in claim 17, wherein the plurality of actuators are coupled to a plurality of actuation lines defining a topography network wherein in the event of an actuator failure, a diametrically opposed actuator is deactivated.

19. The method of actuating a thrust bearing as claimed in claim 18, wherein each diametrically opposed actuator pair is coupled to a single control line.

20. The method of actuating a thrust bearing as claimed in claim 18, wherein alternating actuators are coupled to a single control line.

* * * * *